United States Patent
Burgess et al.

[15] 3,679,299
[45] July 25, 1972

[54] METHOD AND APPARATUS FOR OPTICAL PROJECTION OF DEFORMATION IMAGES

[72] Inventors: James F. Burgess; Robert F. Kopczewski; John M. Holeman, all of Schenectady, N.Y.

[73] Assignee: General Electric Company

[22] Filed: Dec. 20, 1968

[21] Appl. No.: 785,582

[52] U.S. Cl. ............................................................ 353/67
[51] Int. Cl. ........................................................ G03b 21/06
[58] Field of Search ................... 353/65, 66, 67; 340/173 TP; 355/9; 350/161, 167; 178/6.6 TP, 5.4 BD, 7.5 D

[56] References Cited

UNITED STATES PATENTS

| | | | |
|---|---|---|---|
| 2,843,009 | 7/1958 | Stevens | 353/67 |
| 3,166,625 | 1/1965 | Brumley | 350/167 |
| 3,178,993 | 4/1965 | Ferris et al. | 350/167 |
| 3,238,296 | 3/1966 | Nelson et al. | 178/7.5 D |
| 3,044,358 | 6/1962 | Glenn | 350/161 |
| 3,078,338 | 2/1963 | Glenn | 350/161 |

Primary Examiner—Leonard Forman
Assistant Examiner—A. J. Mirabito
Attorney—Richard R. Brainard, Charles T. Watts, Paul A. Frank, Frank L. Neuhauser, Oscar B. Waddell and Melvin M. Goldenberg

[57] ABSTRACT

The optical projection of information stored in a relief image such as a pattern of surface deformation of a light reflecting medium is accomplished by a projector which images on a screen the foci of either of the two sets of mirrors produced by the curved surfaces of the deformations. The hollows or concave mirrors provided by the bottoms of the deformations have their foci in front of the recording and when imaged on a screen by the projection optics provide a bright line image on a light background. The convex mirrors at the edges of the deformations have their foci (virtual) located to the rear of the recording and when imaged on the screen by the projection optics provide a dark outline of the deformations on a light background. In the embodiment illustrated, the projector is a reader and is provided with a back projection screen at the same end of the reader as the recording to be projected and the projection path includes suitable mirrors for reversing the direction of the projected light.

5 Claims, 6 Drawing Figures

Inventors:
James F. Burgess,
Robert F. Kopczewski,
John M. Holeman,
by Richard R. Brainard
Their Attorney.

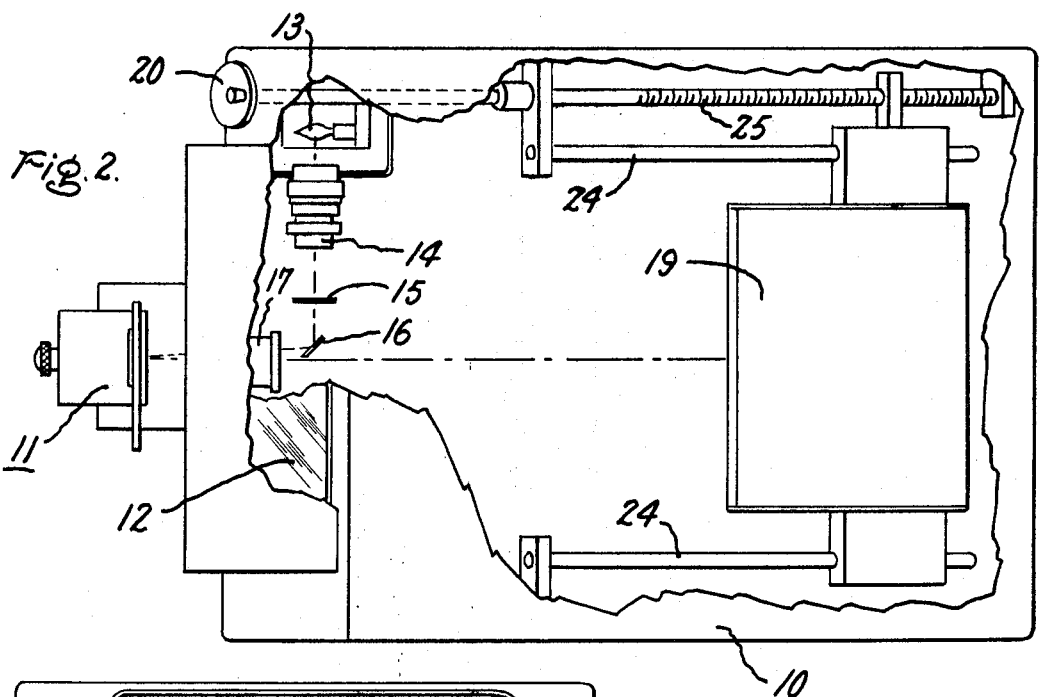
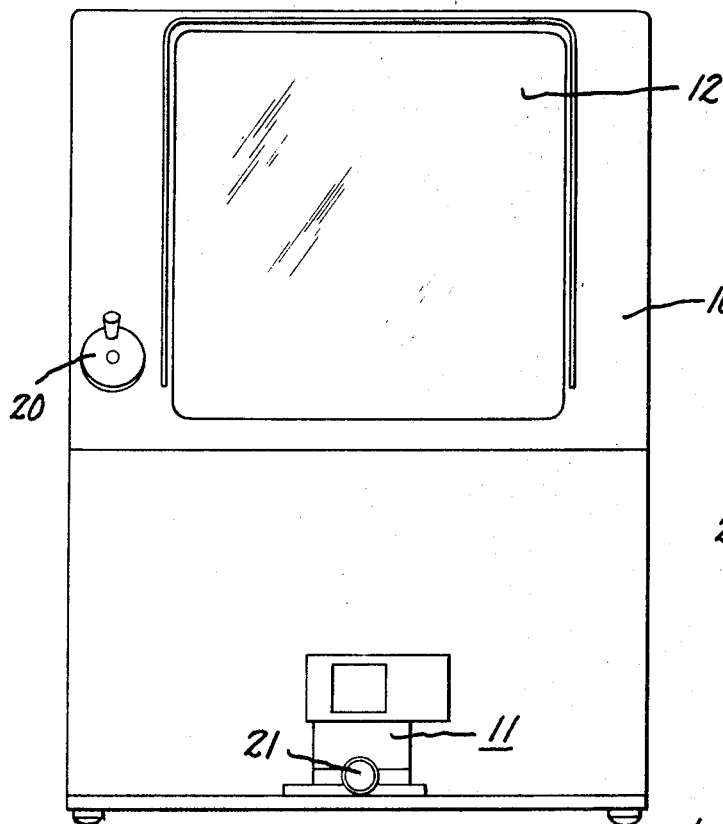
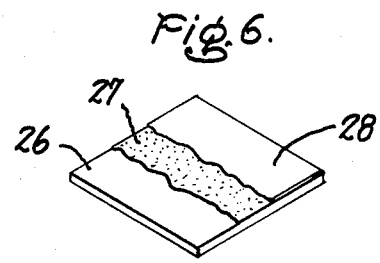

Inventors:
James F. Burgess,
Robert F. Kopczewski,
John M. Holeman,
by Richard R. Brainard
Their Attorney.

METHOD AND APPARATUS FOR OPTICAL PROJECTION OF DEFORMATION IMAGES

The present invention relates to an improved method and apparatus for optically projecting information stored as surface deformations of a recording medium.

Methods of recording information in the form of a pattern of surface deformations in a thermoplastic recording medium have been developed. In these methods, the deformations may be formed by the forces resulting from an electric charge pattern which may be established, for example, by an electron beam or by a precharged photoconductive material associated with the thermoplastic layer. Methods of this type are further described and claimed, respectively, in U.S. Pat. No. 3,113,178—Glenn, Jr., granted Dec. 3, 1963 and U.S. Pat. No. 3,291,601—Gaynor, granted Dec. 13, 1966, respectively.

The information contained in recordings of the above type frequently have been read out or reproduced optically by a projection system making use of a light mask which blocks light undeviated by the deformation pattern. These systems have worked satisfactorily but have some limitations which are inherently imposed by the nature of the optical readout. For example, efficiency tends to be limited as a result of the blocked undeviated light and the resolution tends to be limited by the unwanted diffraction that takes place at the masking system. Also, since the deformed medium itself is focused on the image or output area, dirt or other imperfections on the medium are clearly reproduced in the image area.

In accordance with an important aspect of the present invention, the reflective recording medium is illuminated by collimated or nearly collimated light and the plane of the foci of the mirrors formed by the deformations are focused on the image area. In a typical deformation recording, the relief image elements each form a concave curvature or mirror at the center of the depression and a convex curvature or mirror at either edge of the image element. The foci of the mirrors produced by the convex curvatures at the edges of the deformations appear to lie behind the plane of the medium and those produced by the concave lenslets appear to lie in a plane in front of the recording medium. The present invention contemplates a method and apparatus in which either one of these sets of foci are focused on the image area.

The features and advantages of the present invention as well as a better understanding of it will be obtained by a consideration of the following detailed description taken in connection with the accompanying drawings and its scope will be pointed out in the appended claims.

In the drawing:

FIG. 2 is a top view, with top broken away, of the projector shown in FIG. 1;

FIG. 3 is a front end elevational view of the projector of FIG. 1;

FIG. 6 is a schematic view of a recording useful in the present invention.

Figure 1:
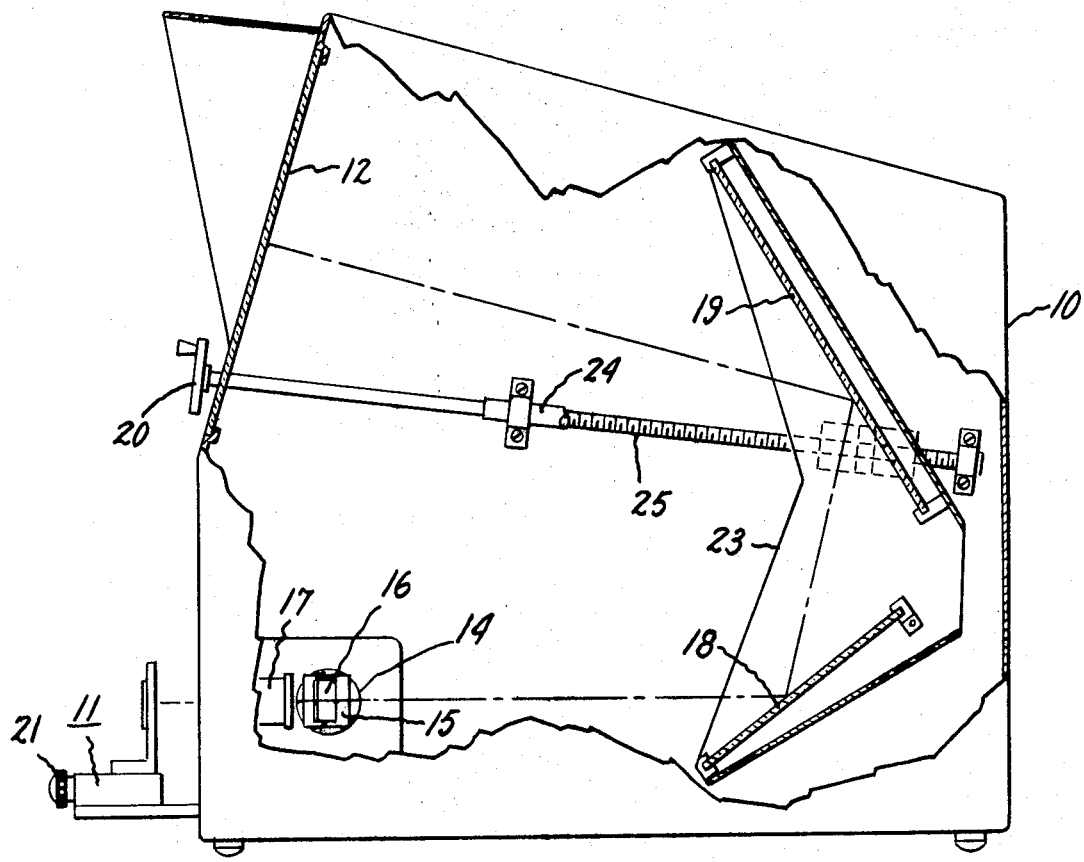
FIG. 1 is a side elevational view, with side removed, of a projector embodying our invention.
Figure 4:
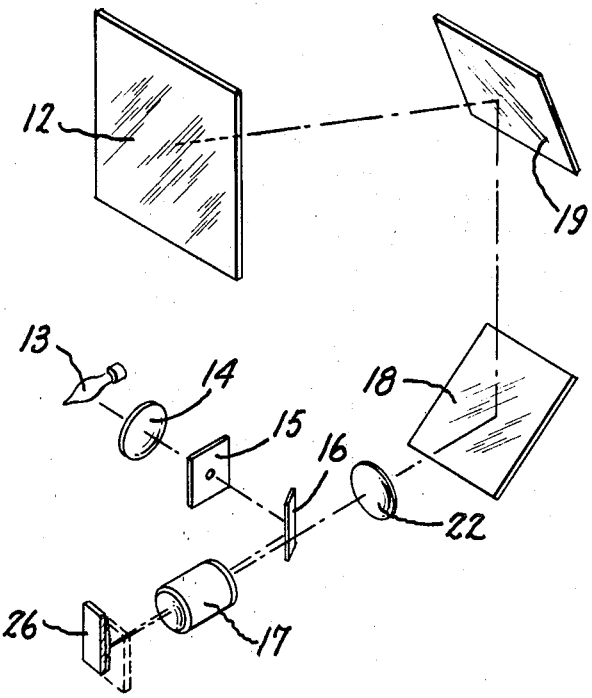
FIG. 4 is a schematic representation of the optical system of the projector of FIG. 1.

A slide projector embodying the present invention and suitable for carrying out the method of the present invention is illustrated in the drawing in which a generally rectangular cabinet 10 is provided for housing an optical system and supporting, at one end thereof, as shown in FIG. 3, an adjustable picture or slide mount 11 for carrying the recording medium and a back projection screen 12 which provides the image or output area to be viewed by the observer. The projector includes a source of illumination, such as a projection lamp 13, which in the illustrated embodiment is located off the projection axis and light emanating therefrom is condensed by condensing lens 14 and limited by an aperture plate 15 so that it impinges on an off axis tilted mirror 16. Light from the mirror is reflected through the projection lens assembly 17, which also operates as a collimating lens, to illuminate the reflective recording medium carried by the slide assembly 11 with substantially collimated light. Light reflected from the medium passes through the projection lens assembly 17 and impinges upon a tilted mirror 18, which reflects the light to tilted mirror 19 to redirect it toward the back projection screen 12. The mirrors essentially fold the projection path back upon itself to permit viewing from the same end of the projector as the slides or recordings are manipulated. The enlargement accomplished by the projector may be adjusted by adjusting the position of the tilted mirrors by means of crank 20. It will, of course, be necessary in order to maintain the proper imaging of the output to adjust the position of the slide with respect to the projection lens 17. This is accomplished by thumb screw 21. Lens 22 (FIG. 4) may be included in the projection path if additional magnification is desired.

As indicated above, magnification may be controlled by adjusting the position of the mirrors 18 and 19. These mirrors are carried by common supports 23 which are moveable along the guides 24 and activated by the lead screw 25 and crank 20. Adjustment of the mirrors, of course, requires adjustment of the slide holder to bring the image in focus on the screen 12.

As shown in FIG. 6, a typical recording medium includes a substrate 26, a thermally deformable plastic layer 27 which may also include a photoconducting agent, and an overlying metal film 28 which is sufficiently thin to be deformed by the forces generated in the thermoplastic in accordance with the charge pattern when the thermoplastic is heated, but which constitutes a surface which provides spectral reflection. Such coatings and media are further described and claimed in Burgess application Ser. No. 418,339, filed Dec. 14, 1964, now U.S. Pat. No. 3,415,681, granted Dec. 10, 1968, and assigned to the assignee of the present invention.

Figure 5:
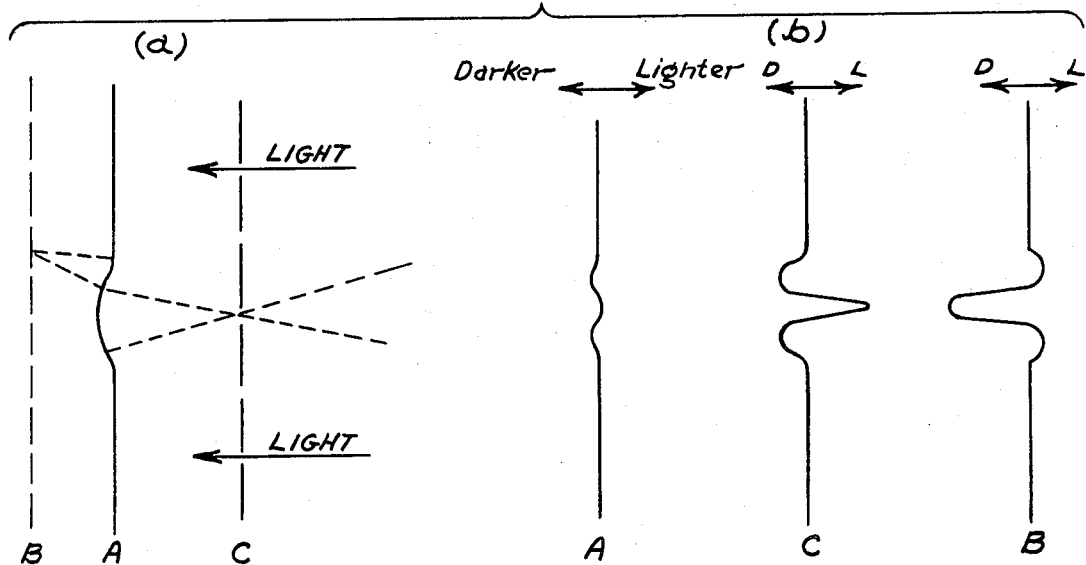
FIG. 5 is a schematic representation of the control of the light output by the optical system of FIG. 4.

As apparent from the consideration of FIG. 5, the projector of the present invention makes use of the same lens assembly 17 for both projection and for collimating light from the source 13 so that the reflecting surface of the recording medium is illuminated by essentially parallel light. It will be understood that in the broader aspects of the present invention it is possible to utilize a separate lens alongside the projection lens or an annular lens surrounding the projection lens. Also, an on-axis beam-splitter between the recording and the projection lens 17 may be used for the purpose of illuminating the recording with substantially collimated light.

FIG. 5 shows schematically how the foci of the mirrors formed by the deformation recording lie in planes which are in front of the recording medium for concave curvatures on the face of the recording and behind the plane of the medium for the convex curvatures occurring at the edges of each deformation. FIG. 5 also shows schematically how the deformations form mirrors which control the projected light to produce image areas which are respectively brighter and darker than the background. When the projector is adjusted to image the foci due to the concave mirrors on the image area, i.e., plane C is imaged on the screen, recorded letters, for example, appear essentially in dark outline with bright centers. This is illustrated at C in FIG. 5(b). This has been referred to as the image of best resolution. When the foci due to the convex curvature appearing at the edges of the deformations are imaged on the image area (i.e., plane B is imaged on the screen) the image is darker in the center with lighter surrounding outline. This is illustrated at B in FIG. 5(b). This image has been referred to as the image of best contrast.

From the foregoing detailed description, it is apparent that the present invention provides an improved method of projecting images contained in deformation recordings in which the plane of the foci of the lenslets produced by the deformation is imaged on the image plane rather than the medium itself, such as occur in Schlieren optical systems. It is also apparent that the present invention provides an improved projecting apparatus for carrying out this method.

What we claim as new and desire to secure by Letters Patent of the United States is:

1. A method of projecting information stored in a recording medium as a pattern of surface deformations including reflective surfaces with substantially similar deformations therein forming concave and convex mirrors, said concave mirrors having foci in planes in front of said medium and said convex mirrors having foci in planes behind said medium, said method comprising illuminating the reflective surface of said medium with substantially parallel light and imaging the planes of said foci of either said concave or said convex mirrors on an image area.

2. A projection system for projecting an image of information stored on a recording medium as a pattern of surface deformations, said recording medium having a reflective surface with substantially similar surface deformations which form concave and convex mirrors said concave mirrors having foci in planes in front of said medium and said convex mirrors having foci in planes behind said medium said system comprising means for supporting the recording medium, means directing substantially collimated light to the reflecting surface, a projection lens positioned along the path of light reflected from the surface of the recording medium at a distance therefrom such that the focal plane of the projection lens coincides with the planes of said foci of either said concave or convex mirrors provided by the deformations, a screen, said projection lens imaging the planes of said foci of either said concave or convex mirrors on said screen.

3. A projection system for projecting an image of information stored on a recording medium in the form of surface deformations, said recording medium having a reflecting surface with substantially similar deformations forming concave mirrors with foci in planes in front of said medium and convex mirrors with foci in planes behind said medium, said system comprising a cabinet, means for supporting the recording medium at one end of said cabinet, means directing substantially collimated light to the reflecting surface of the medium, a projection lens in the path of light reflected from said medium transmitting reflected light toward the opposite end of said cabinet, said projection lens being positioned along the path of reflected light a distance from said recording medium, such that the focal plane of the projection lens coincides with the planes of said foci of one of said either said concave or said convex mirrors provided by the deformations of said medium, means for redirecting the light towards said one end of said cabinet and a back projection screen on said one end of said cabinet for displaying the information recorded on said medium.

4. The system of claim 2 wherein said means directing substantially collimated light onto said medium includes a light source off the projection axis of the system and a mirror tilted with respect to the projection axis.

5. The system of claim 3 wherein both said recording medium and said redirecting means are adjustable with respect to said projection lens.

* * * * *